(12) United States Patent
Usuda et al.

(10) Patent No.: US 8,331,942 B2
(45) Date of Patent: Dec. 11, 2012

(54) MOBILE COMMUNICATION CONTROL METHOD, WIRELESS LINE CONTROL APPARATUS, BASE STATION AND MOBILE STATION

(75) Inventors: Masafumi Usuda, Tokyo (JP); Anil Umesh, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1183 days.

(21) Appl. No.: 11/663,000

(22) PCT Filed: Sep. 15, 2005

(86) PCT No.: PCT/JP2005/017065
§ 371 (c)(1),
(2), (4) Date: Jun. 29, 2007

(87) PCT Pub. No.: WO2006/030870
PCT Pub. Date: Mar. 23, 2006

(65) Prior Publication Data
US 2008/0026761 A1    Jan. 31, 2008

(30) Foreign Application Priority Data
Sep. 15, 2004   (JP) ................. P2004-268946

(51) Int. Cl.
*H04Q 7/22* (2006.01)
(52) U.S. Cl. ..................... 455/442; 455/560
(58) Field of Classification Search .......... 455/424, 455/436, 437, 438, 442, 561; 370/328, 331, 370/338, 431
See application file for complete search history.

(56) References Cited

U.S. PATENT DOCUMENTS 5,923,650 A * 7/1999 Chen et al. ............ 370/331
(Continued)

FOREIGN PATENT DOCUMENTS

CN     1263681 A    8/2000
(Continued)

OTHER PUBLICATIONS

3GPP TR 25.896 V2.0.0 (Mar. 2004), $3^{rd}$ Generation Partnership Project; Technical Specification Group Radio Access Network; Feasibility Study for Enhanced Uplink for UTRA FDD; (Release 6), p. 1-p. 180.

(Continued)

*Primary Examiner* — Ajit Patel
*Assistant Examiner* — Myron K Wyche
(74) *Attorney, Agent, or Firm* — Marvin A. Motsenbocker; Mots Law, PLLC

(57) ABSTRACT

It is an object of the present invention to perform a soft handover control in which an error rate is low in the Enhanced Uplink. A mobile communication control method according to the present invention includes the steps of: performing a change control for a transmission rate of uplink data to be transmitted from a mobile station UE to a first base station Node-B #1, while the first base station Node-B #1 and the mobile station UE are communicating with each other; determining that the mobile station UE is to perform soft handover between the first base station Node-B #1 and a second base station Node-B #2; instructing the first base station Node-B #1 and the mobile station UE to stop the change control for the transmission rate of the uplink data; and instructing the mobile station UE and the second base station Node-B #2 to start the soft handover.

12 Claims, 12 Drawing Sheets

U.S. PATENT DOCUMENTS

| | | |
|---|---|---|
| 6,597,894 B1 | 7/2003 | Ue et al. |
| 2002/0147020 A1 | 10/2002 | Iguchi et al. |
| 2003/0133415 A1 | 7/2003 | Kim et al. |
| 2003/0193907 A1 | 10/2003 | Rezaiifar et al. |
| 2004/0147286 A1* | 7/2004 | Kim et al. .................... 455/560 |
| 2004/0160959 A1 | 8/2004 | Balachandran et al. |
| 2004/0198359 A1 | 10/2004 | Uchida et al. |
| 2005/0030964 A1* | 2/2005 | Tiedemann et al. .......... 370/431 |
| 2007/0086381 A1* | 4/2007 | Lee et al. ..................... 370/331 |

FOREIGN PATENT DOCUMENTS

| | | |
|---|---|---|
| EP | 1 447 938 A2 | 8/2004 |
| JP | 05-130022 A | 5/1993 |
| JP | 2000-049663 A | 2/2000 |
| JP | 2002-305767 A | 10/2002 |
| JP | 2003-518889 A | 6/2003 |
| JP | 2004-193786 A | 7/2004 |
| KR | 2000-0069530 A | 11/2000 |
| KR | 2001-0025772 A | 4/2001 |
| WO | 02/43429 A1 | 5/2002 |
| WO | 03/067783 A2 | 8/2003 |
| WO | 2004/014097 A1 | 2/2004 |
| WO | WO2004/064273 A1 | 7/2004 |

OTHER PUBLICATIONS

Chinese Office Action dated May 8, 2009 issued for corresponding Chinese patent application No. 200580030965.4., and English translation.

Korean Office Action dated May 29, 2009 issued for corresponding Korean patent application No. 10-2007-7008539, and English translation.

The office communication of Aug. 2, 2011, issued in the counterpart Korean patent application.

Suwon Park et al.;"Uplink Transmit Power Control during Soft Handoff in DS/CDMA Systems";XP-001076292;p. 2913-2917 (2001).

The Extended European search report issued on Mar. 6, 2012 in the counterpart European patent application.

* cited by examiner

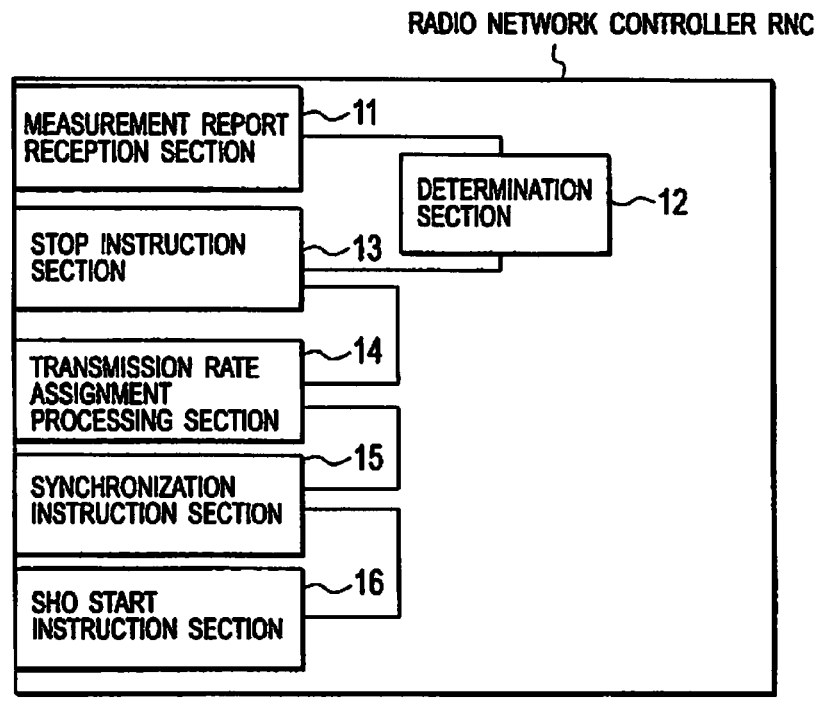
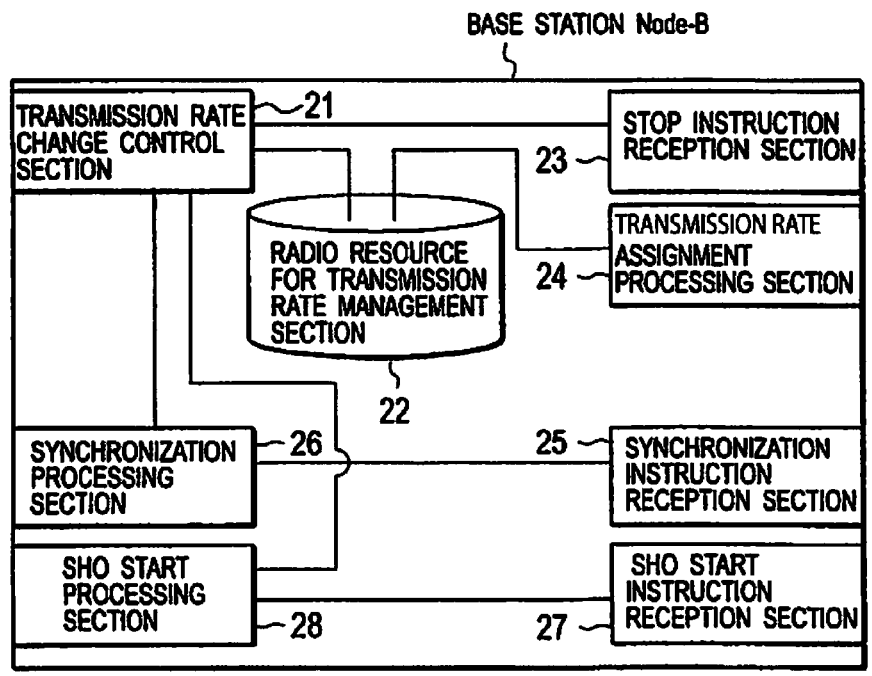

| TTI NUMBER | 1 | 2 | 3 | 4 | 5 | 6 | 7 | ... |
|---|---|---|---|---|---|---|---|---|
| TRANSMISSION RATE CONTROL INFORMATION FROM BASE STATION Node-B #1 | Up | Up | Down | Up | Keep | Down | Up | ... |
| TRANSMISSION RATE CONTROL INFORMATION FROM BASE STATION Node-B #2 | Up | Up | Up | Up | Up | Keep | Up | ... |
| DISPLACEMENT OF TRANSMISSION RATE OF UPLINK DATA IN MOBILE STATION | Up | Up | Down | Up | Keep | Down | Up | ... |

| TTI NUMBER | 1 | 2 | 3 | 4 | 5 | 6 | 7 | ... |
|---|---|---|---|---|---|---|---|---|
| TRANSMISSION RATE CONTROL INFORMATION FROM BASE STATION Node-B #1 | 1M | 1M | 1M | 768k | 768k | 1M | 1M | ... |
| TRANSMISSION RATE CONTROL INFORMATION FROM BASE STATION Node-B #2 | 384k | 256k | 256k | 256k | 384k | 768k | 768k | ... |
| DISPLACEMENT OF TRANSMISSION RATE OF UPLINK DATA IN MOBILE STATION | 384k | 256k | 256k | 256k | 384k | 768k | 768k | ... |

MOBILE COMMUNICATION CONTROL METHOD, WIRELESS LINE CONTROL APPARATUS, BASE STATION AND MOBILE STATION

TECHNICAL FIELD

The present invention relates to a mobile communication control method, a radio network controller, a base station, and a mobile station, which improve communication performance (communication capacity, communication quality, and the like) of a mobile communication system. In particular, the present invention is a technology that is adaptable to the "W-CDMA" system and the "CDMA2000" system, which are the third-generation mobile communication systems.

BACKGROUND ART

In a conventional mobile communication system, in the case of setting a dedicated channel, a radio network controller RNC determines a transmission rate of uplink data in consideration for a radio resource of a base station Node-B, an interference amount in an uplink data communication, transmission power of a mobile station UE, transmission processing performance of the mobile station UE, a transmission rate required by an upper-level application, and the like. Then, the radio network controller RNC notifies the determined transmission rate of the uplink data individually to the mobile station UE and the base station Node-B by a message of the Layer 3 (radio resource control layer).

Here, the radio network controller RNC is an apparatus that is located at an upper level of the base station and controls the base station Node-B and the mobile station UE.

In general, in the data communication, it is more frequent that traffic occurs in a bursting manner than in a voice communication and a video telephone communication, and it is primarily desirable to change the transmission rate at a high speed.

However, as shown in FIG. 1, the radio network controller RNC usually controls many base stations Node-B in a centralizing manner, and accordingly, in the conventional mobile communication system, there has been a problem that it is difficult to perform such a high-speed (for example, at approximately 1 to 100 ms) change control for the transmission rate because of the reasons such as a processing load and a processing delay.

Moreover, in the conventional mobile communication system, even if the high-speed change control for the transmission rate can be performed, there has been a problem that implementation cost of the apparatus and operation cost thereof are increased to a large extent.

Therefore, in the conventional mobile communication system, it is usual to perform the change control for the transmission rate in several hundred-millisecond to several-second orders.

Hence, in the conventional mobile communication system, in the case of performing a bursting data transmission as shown in FIG. 2(a), the data is transmitted as shown in FIG. 2(b) while permitting a low speed, a high delay, and low transfer efficiency, or the data is transmitted as shown in FIG. 2(c) while ensuring a radio resource for a high-speed communication and permitting waste of a radio bandwidth resource and a hardware resource in the base station during an open time.

Note that, in FIG. 2, both of the above-described radio bandwidth resource and hardware resource apply to a radio resource of an axis of ordinates.

In this connection, in the "3GPP" and the "3GPP2" which are the international standardization organizations of the third-generation mobile communication system, there has been studied a high-speed radio resource control method in the Layer 1 and the MAC sublayer between the base station and the mobile station for the purpose of effectively utilizing the radio resource. Hereinafter, such a study and a function thus studied will be generically referred to as "Enhanced Uplink".

The radio resource control method studied in the "Enhanced Uplink" is broadly classified into two, and a description will be briefly made below of the classified methods.

As the first radio resource control method, the "dedicated rate control" is being studied. In the "dedicated rate control", the base station Node-B determines the transmission rate (or maximum allowable transmission rate) of the uplink data in each mobile station UE at every predetermined timing, and notifies the determined transmission rate (or maximum allowable transmission rate) to each mobile station UE, thereby performing the change control for the transmission rate of the uplink data in each mobile station UE. The mobile station UE designated by the base station Node-B transmits the uplink data at the determined transmission rate (or transmission rate within a range of the maximum allowable transmission rate). Here, in the "dedicated rate control", there is studied a method of not giving transmission opportunities to all the mobile stations UE being connected to the base station Node-B every time but sequentially giving the transmission opportunities only to a part of the mobile stations.

As the second radio resource control method, the "common rate control" is being studied. In the "common rate control", the base station Node-B notifies a transmission rate of the uplink data, which is common to the mobile stations UE under communication therewith, or necessary information for calculating the transmission rate (hereinafter, "the transmission rate or necessary information for calculating the transmission rate" will be referred to as "transmission rate information" in a lump) to the mobile stations UE, and each of the mobile stations UE determines the transmission rate of the uplink data in each mobile station UE concerned based on the notified transmission rate information.

(Non-Patent Document 1) 3GPP TR 25.896 v2.0.0 March 2004

However, the change control for the transmission rate of the uplink data in such a radio resource control method has had a problem in an operation when soft handover (SHO) is started.

In the conventional mobile communication system, the radio network controller RNC instructs to start the soft handover for the dedicated channel, based on a measurement report from each mobile station UE. In this case, the radio network controller RNC manages the radio resource in each base station Node-B, and accordingly, the radio network controller RNC grasps a usage situation of the hardware resource of each base station Node-B at the point of time when the start of the soft handover is instructed, and such a circumstance is not usually present, where the start of the soft handover becomes impossible since an available hardware resource is insufficient.

However, in the Enhanced Uplink, since each base station Node-B manages the radio resource, the radio network controller RNC does not grasp the usage situation of the hardware resource of each base station Node-B under the control of the radio network controller RNC.

Hence, even if the radio network controller RNC designates the transmission rate of the uplink data in the case of starting the soft handover, in a base station Node-B that newly takes part in the soft handover, such a situation may possibly occur, where the designated hardware resource cannot be prepared, and the soft handover cannot be started. There has been such a problem.

Moreover, the mobile station UE performs the change control for the transmission rate of the uplink data at every transmission time interval (TTI), and accordingly, there has been a problem that it takes a time for the base station Node-B that newly takes part in the soft handover to grasp the hardware resource to be prepared.

DISCLOSURE OF THE INVENTION

In this connection, the present invention has been made in consideration for the above-described points. It is an object of the present invention to provide a mobile communication control method, a radio network controller, a base station, and a mobile station, which are capable of performing a soft handover control in which an error rate is low in the Enhanced Uplink.

A first aspect of the present invention is summarized as a mobile communication control method, comprising the steps of: performing a change control for a transmission rate of uplink data to be transmitted from a mobile station to a first base station, while the first base station and the mobile station are communicating with each other; determining that the mobile station is to perform soft handover between the first base station and a second base station; instructing the first base station and the mobile station to stop the change control for the transmission rate of the uplink data; and instructing the mobile station and the second base station to start the soft handover.

In the first aspect of the present invention, the mobile communication control method can further include the step of: resuming the change control for the transmission rate of the uplink data, after synchronization between the mobile station and the second base station is established.

In the first aspect of the present invention, the mobile communication control method can further include the steps of: designating the transmission rate of the uplink data to be transmitted from the mobile station to the first base station, while the change control for the transmission rate of the uplink data is being stopped; and transmitting, at the mobile station, the uplink data at the designated transmission rate of the uplink data, while the change control is being stopped.

In the first aspect of the present invention, the mobile communication control method can include the steps of: requesting the second base station to assign the transmission rate of the uplink data which is used for the communication between the first base station and the mobile station, to a communication between the second base station and the mobile station; reporting, at the second base station, instruction information for indicating that the assignment is possible, when the assignment is possible; and reporting, at the second base station, a maximum assignable transmission rate of the uplink data, when the assignment is impossible.

A second aspect of the present invention is summarized as a mobile communication control method of performing a change control for a transmission rate of uplink data to be transmitted from a mobile station to a first base station and a second base station, while the mobile station is performing soft handover between the first base station and the second base station; wherein the mobile station does not increase the transmission rate of the uplink data until there appears a state where the transmission rate of the uplink data is allowed to be increased for both of the first base station and the second base station.

A third aspect of the present invention is summarized as a radio network controller including: a measurement report reception section configured to receive, from a mobile station that is communicating with a first base station, a measurement report for reporting propagation path quality with a second base station, the propagation path quality being measured in the mobile station; a determination section configured to decide, based on the received measurement report, that the mobile station is to perform soft handover between the first base station and the second base station; a stop instruction section configured to instruct, in response to the determination, the first base station and the mobile station to stop a change control for the transmission rate of the uplink data to be transmitted from the mobile station to the first base station; and a soft handover start instruction section configured to instruct the mobile station and the second base station to start the soft handover.

In the third aspect of the present invention, the stop instruction section can be configured to designate the transmission rate of the uplink data to be transmitted from the mobile station to the first base station, while the change control for the transmission rate of the uplink data is being stopped.

In the third aspect of the present invention, the radio network controller can further include: a transmission rate assignment processing section configured to request the second base station to assign the transmission rate of the uplink data which is used for the communication between the first base station and the mobile station, to a communication between the second base station and the mobile station; and a soft handover start instruction section configured to set an initial value of the transmission rate of the uplink data in the soft handover, based on a response result to the request from the second base station, and to instruct the mobile station and the second base station to start the soft handover by notifying the initial value.

A fourth aspect of the present invention is summarized as a base station including a transmission rate change control section configured to perform a change control for a transmission rate of uplink data to be transmitted from a mobile station, while the base station is communicating with the mobile station; wherein the transmission rate change control section is configured to stop the change control for the transmission rate of the uplink data, when it is determined that the mobile station is to perform soft handover between the base station and another base station.

In the fourth aspect of the present invention, the transmission rate change control section can be configured to resume the change control for the transmission rate of the uplink data, after synchronization between the mobile station and the other base station is established.

In the fourth aspect of the present invention, the transmission rate change control section can be configured to use a transmission rate of the uplink data which is designated by a radio network controller, as the transmission rate of the uplink data which is to be used for the communication with the mobile station, while the change control for the transmission rate of the uplink data is being stopped.

A fifth aspect of the present invention is summarized as a base station including: a transmission rate assignment processing section configured to determine whether or not a transmission rate of uplink data, which is requested by a radio network controller, can be assigned to a communication with a mobile station; to report instruction information for indicating that the assignment is possible to the radio network controller, when it is determined that the assignment is possible; and to report a maximum assignable transmission rate of the uplink data to the radio network controller, when it is determined that the assignment is impossible.

In the fifth aspect of the present invention, the transmission rate assignment processing section can be configured to enable the assignment by lowering a transmission rate of the uplink data which is to be used for a communication with an existing mobile station, when it is determined that the assignment is impossible.

A sixth aspect of the present invention is summarized as a mobile station including a transmission rate change control section configured to perform a change control for a transmission rate of uplink data to be transmitted to a base station, while the mobile station is communicating with the base station; wherein the transmission rate change control section is configured to stop the change control for the transmission rate of the uplink data, when it is determined that the mobile station is to perform soft handover between the base station and another base station.

In the sixth aspect of the present invention, the transmission rate change control section can be configured to resume the change control for the transmission rate of the uplink data, after synchronization between the mobile station and the other base station is established.

In the sixth aspect of the present invention, the transmission rate change control section can be configured to use a transmission rate of the uplink data which is designated by a radio network controller, as the transmission rate of the uplink data which is used for the communication with the mobile station, while the change control for the transmission rate of the uplink data is being stopped.

A seventh aspect of the present invention is summarized as a mobile station that performs a change control for a transmission rate of uplink data to be transmitted to a first base station and a second base station while performing soft handover between the first base station and the second base station; wherein the mobile station does not increase the transmission rate of the uplink data until there appears a state where the transmission rate of the uplink data is allowed to be increased for both of the first base station and the second base station.

BRIEF DESCRIPTION OF THE DRAWINGS

FIG. 5 is a functional block diagram of a radio network controller according to the first embodiment of the present invention.

FIG. 6 is a functional block diagram of a base station according to the first embodiment of the present invention.

BEST MODE FOR CARRYING OUT THE INVENTION (Configuration of Mobile Communication System According to First Embodiment of the Present Invention)

Figure 1:
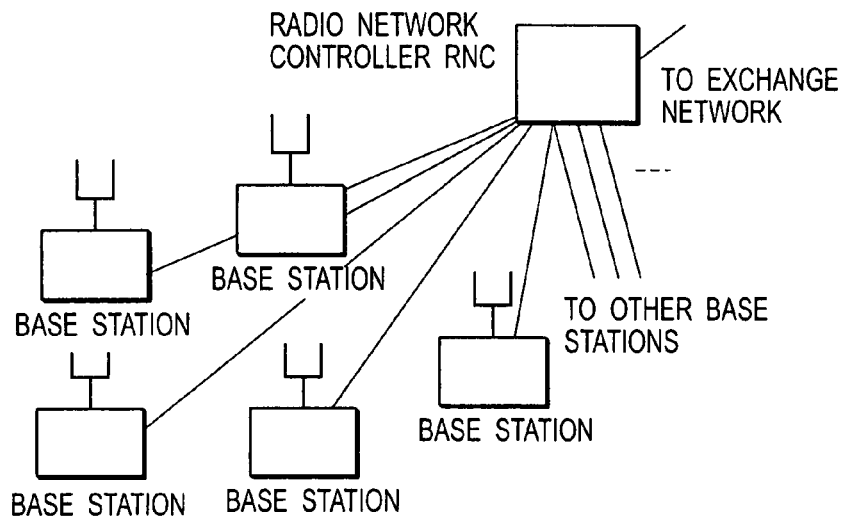
FIG. 1 is an entire configuration view of a mobile communication system according to a conventional technology.
Figure 2:
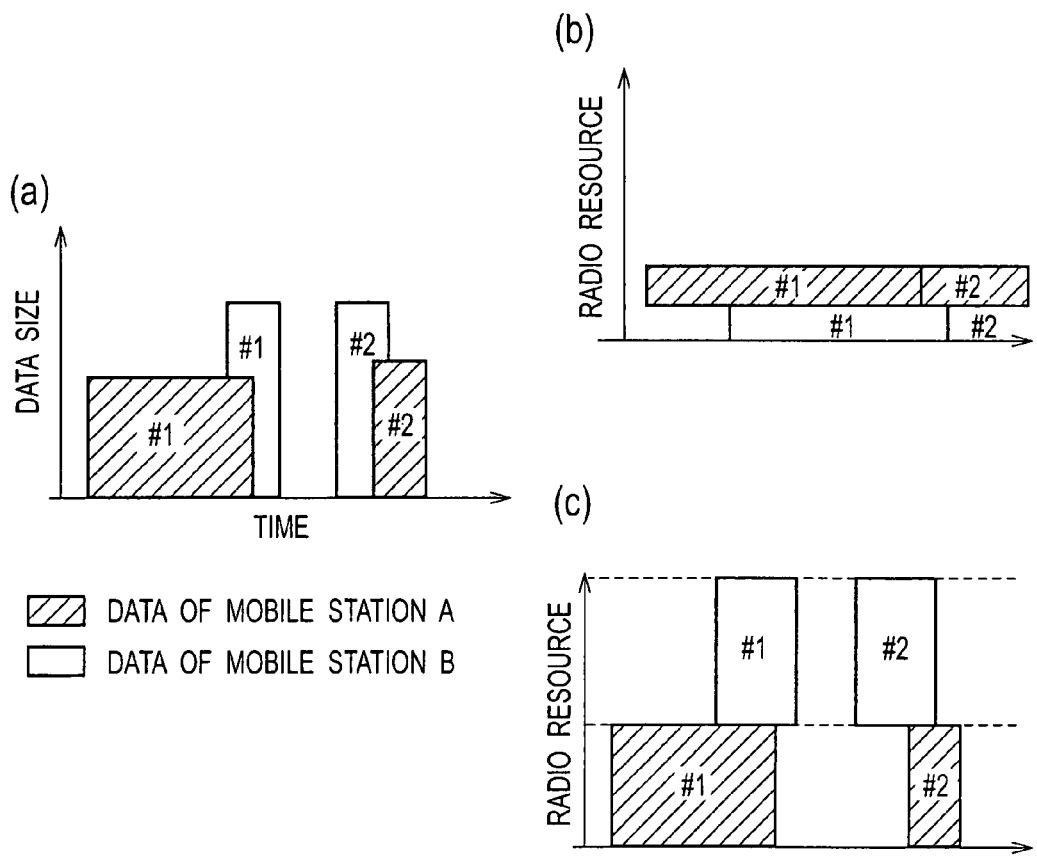
FIGS. 2(a) to 2(c) are views showing states of assigning radio resources to mobile stations in the mobile communication system according to the conventional technology.
Figure 3:
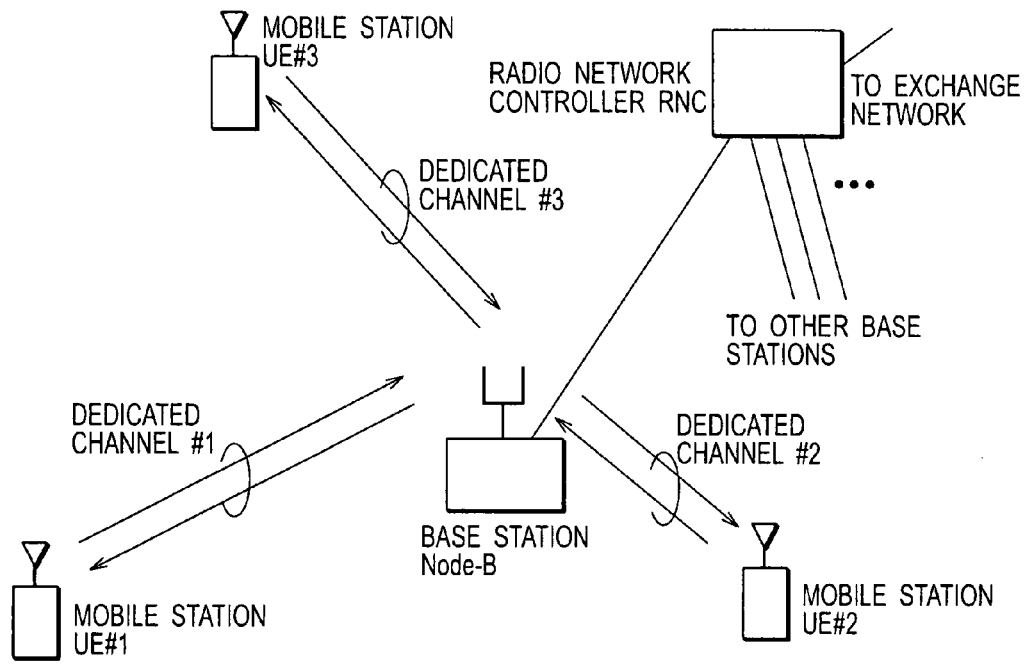
FIG. 3 is an entire configuration view of a mobile communication system according to first and second embodiments of the present invention.

An example of an entire configuration of a mobile communication system according to a first embodiment of the present invention is shown in FIG. 3. As shown in FIG. 3, the mobile communication system according to this embodiment includes an exchange network, a radio network controller RNC, a base station Node-B, and mobile stations UE #1 to #3. Note that the individual mobile stations UE #1 to #3 transmit and receive data by using dedicated channels #1 to #3, respectively.

Figure 4:
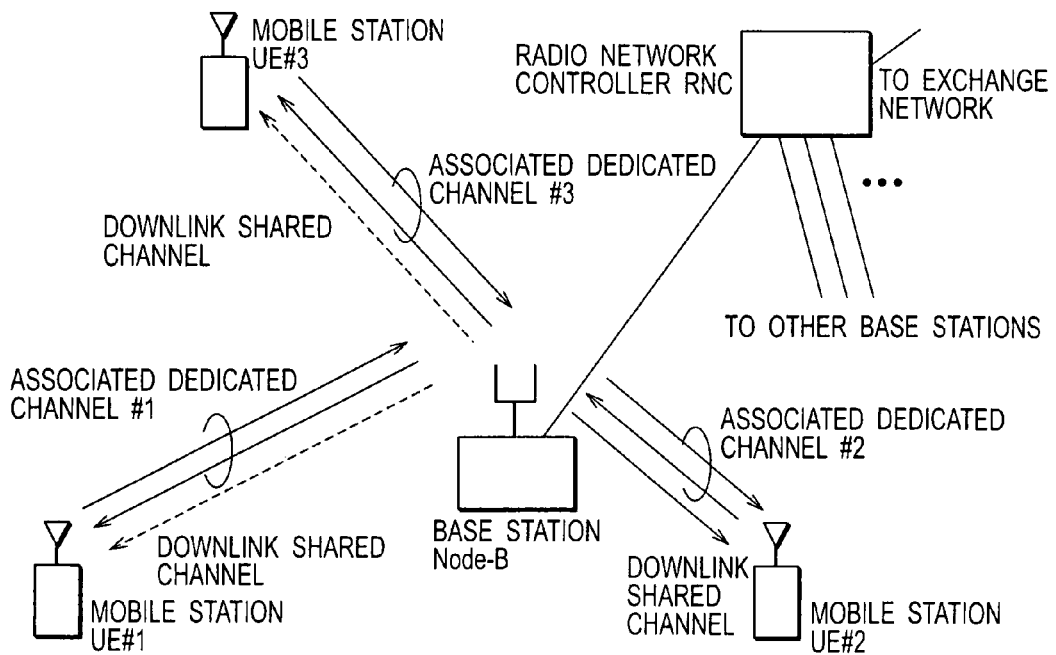
FIG. 4 is an entire configuration view of a mobile communication system according to the first and second embodiments of the present invention.

Here, as shown in FIG. 4, the case is also considered, where high-speed downlink shared channels (HS-DSCHs in the 3GPP) are used in the mobile communication system according to this embodiment. In such a case, downlink data is transmitted mainly by using the downlink shared channels.

Moreover, associated dedicated channels are bi-directional channels assigned dedicatedly to the respective mobile stations UE that make communications by using the downlink shared channels. In the uplink associated dedicated channels, pilot symbols, transmission power control commands for the downlink associated dedicated channels, downlink quality information for use in scheduling and adaptive modulation and coding of the downlink shared channels, and the like are transferred as well as user data. Furthermore, in the downlink associated dedicated channels, transmission power control commands for the uplink associated dedicated channels, and the like are transferred. In FIG. 4, it is defined that the channels are not assigned to the downlink shared channels shown by dotted lines at this point of time.

Functional blocks of the radio network controller RNC according to this embodiment are shown in FIG. 5. As shown in FIG. 5, the radio network controller RNC includes a measurement report reception section 11, determination section 12, a stop instruction section 13, a transmission rate assignment processing section t 14, a synchronization instruction section 15, and an SHO start instruction section 16.

The measurement report reception section 11 is configured to receive, from the mobile station UE that is making a communication with a first base station Node-B #1, a measurement report ("measurement report" in the 3GPP) for reporting propagation path quality between the mobile station UE concerned and a second base station Node-B #2, which is measured in the mobile station UE. Details of the measurement report will be described below.

The determination section 12 is configured to determine that the mobile station UE is to perform soft handover between the first base station Node-B #1 and the second base station Node-B #2, based on the measurement report received by the measurement report reception section 11.

The stop instruction section 13 is configured to instruct, when it has been determined by the determination section 12 that the above-described soft handover is to be performed, the first base station Node-B #1 and the mobile station UE to stop a change control for a transmission rate of the uplink data to be transmitted from the mobile station UE to the first base station Node-B #1.

Moreover, the stop instruction section 13 may be configured to designate a transmission rate of the uplink data as well as to make the above-described instruction. Such transmission rate of the uplink data is one for use in the case of transmitting the uplink data to the first base station Node-B #1 from the mobile station UE, while the above-described change control for the transmission rate of the uplink data is being stopped.

The transmission rate assignment processing section 14 is configured to request the second base station Node-B #2 to assign a transmission rate (that is, a radio resource for realizing a communication at the transmission rate) of the uplink data for use in a communication between the second base station Node-B #2 and the mobile station UE.

For example, the transmission rate assignment processing section 14 requests the second base station Node-B #2 to assign the transmission rate of the uplink data for use in the communication between the first base station Node-B #1 and the mobile station UE, to the communication between the second base station Node-B #2 and the mobile station UE.

The synchronization instruction section 15 is configured to instruct the second base station Node-B #2 to achieve synchronization between the second base station Node-B #2 and the radio network controller RNC, and to instruct the second base station Node-B #2 and the mobile station UE to achieve synchronization between the second base station Node-B #2 and the mobile station UE.

The SHO start instruction section 16 is configured to instruct the mobile station UE, the first base station Node-B #1, and the second base station Node-B #2 to start the soft handover to be performed by the mobile station UE between the first base station Node-B #1 and the second base station Node-B #2.

Specifically, the SHO start instruction section 16 sets an initial value of the transmission rate of the uplink data in the soft handover based on a response result to the above-described assignment request of the transmission rate from the second base station, notifies the initial value to the mobile station UE and the second base station Node-B #2, so as to instruct to start the soft handover.

Note that, when the second base station Node-B #2 reports instruction information for indicating that it is possible to assign the transmission rate of the uplink data as requested above, the SHO start instruction section 16 sets such transmission rate of the uplink data as the initial value of the transmission rate of the uplink data in the soft handover.

Meanwhile, when the second base station Node-B #2 reports the maximum assignable transmission rate of the uplink data since it is impossible to assign the transmission rate of the uplink data as requested, the SHO start instruction section 16 sets the reported transmission rate of the uplink data as the initial value of the transmission rate of the uplink data in the soft handover.

Functional blocks of the base station Node-B according to this embodiment is shown in FIG. 6. As shown in FIG. 6, the base station Node-B according to this embodiment includes a transmission rate change control section 21, a radio resource for transmission rate management section 22, a stop instruction reception section 23, a transmission rate assignment processing section 24, a synchronization instruction reception section 25, a synchronization processing section 26, an SHO start instruction reception section 27, and an SHO start processing section 28.

The transmission rate change control section 21 is configured to perform the change control for the transmission rate of the uplink data to be transmitted from the mobile station UE, while the base station Node-B is making the communication with the mobile station UE.

Figure 7:
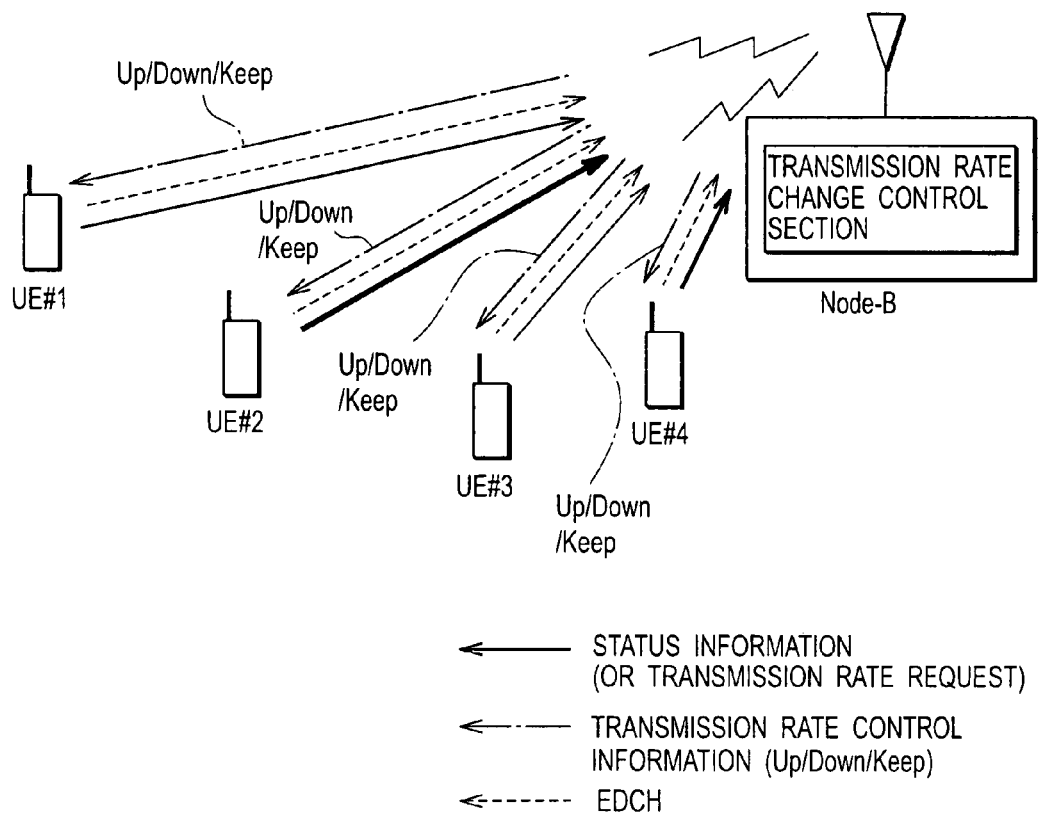
FIG. 7 is a view showing a state of controlling a transmission rate of uplink data in the mobile communication system according to the first embodiment of the present invention.

A state where the transmission rate change control section 21 performs the change control for the transmission rate (that is, a dedicated rate control) of the uplink data between the mobile station UE and the base station Node-B is shown in FIG. 7.

As shown in FIG. 7, at every predetermined timing, the transmission rate change control section 21 determines how to change the transmission rate of the uplink data in each mobile station UE, based on status information (or a transmission rate request) transmitted from each mobile station UE.

The transmission rate change control section 21 notifies transmission rate control information that indicates such determination to each mobile station UE. Each mobile station UE determines the transmission rate of the uplink data, based on the notified transmission rate control information, and transmits the data by using an EDCH at the determined transmission rate or less.

Here, for example, the transmission rate control information includes any of a transmission rate control bit "Up" that instructs the transmission rate of the uplink data to be increased, a transmission rate control bit "Down" that instructs the transmission rate of the uplink data to be decreased, and a transmission rate control bit "Keep" that indicates the transmission rate of the uplink data to be kept without being changed.

Moreover, the transmission rate change control section 21 of the first base station Node-B #1 may be configured to stop the change control for the transmission rate of the uplink data, in response to an instruction from the stop instruction reception section 23 (that is, when it is determined that the mobile station UE is to perform the soft handover between the first base station Node-B #1 and the second base station Node-B #2).

Furthermore, the transmission rate change control section 21 of the first base station Node-B #1 may be configured to resume the change control for the transmission rate of the uplink data, after the synchronization between the mobile station UE and the second base station Node-B #2 is established.

Furthermore, the transmission rate change control section 21 of the first base station Node-B #1 may be configured to use a transmission rate of the uplink data received together with a stop instruction by the stop instruction reception section 23 (that is, a transmission rate of the uplink data, which is designated by the radio network controller RNC), as the transmission rate of the uplink data which is used in the communication with the mobile station UE, while the change control for the transmission rate of the uplink data is being stopped.

Moreover, the transmission rate change control section 21 of the first base station Node-B #1 may be configured to keep on stopping the control change for the transmission rate of the uplink data, while the mobile station UE is performing the soft handover.

The radio resource for transmission rate management section 22 is configured to manage a usage situation of a radio resource (in particular, a hardware resource) for realizing a predetermined transmission rate of the uplink data in the base station Node-B.

The stop instruction reception section 23 is configured to instruct the transmission rate change control section 21 to stop the change control for the transmission rate of the uplink data, in the case of having received the stop instruction transmitted from the radio network controller RNC.

Moreover, when the stop of the change control for the transmission rate of the uplink data is completed, the stop instruction reception section 23 notifies the completion to the radio network controller RNC.

The transmission rate assignment processing section 24 is configured to determine whether or not the transmission rate of the uplink data which is required by the radio network controller RNC, can be assigned to an uplink communication between the mobile station UE and the base station Node-B.

Then, in the case of having determined that it is possible to assign the requested transmission rate of the uplink data, the transmission rate assignment processing section 24 is configured to report, to the radio network controller RNC, instruction information for indicating that it is possible to assign the requested transmission rate of the uplink data.

Meanwhile, the transmission rate assignment processing section 24 is configured to report the maximum assignable transmission rate of the uplink data in the base station Node-B to the radio network controller RNC, in the case of having determined that it is impossible to assign the requested transmission rate of the uplink data.

Moreover, the transmission rate assignment processing section 24 may be configured to make it possible to assign the requested transmission rate of the uplink data, by lowering a transmission rate of the uplink data which is used for a communication with the existing mobile station, in the case of having determined that it is impossible to assign the requested transmission rate of the uplink data.

Figure 8:
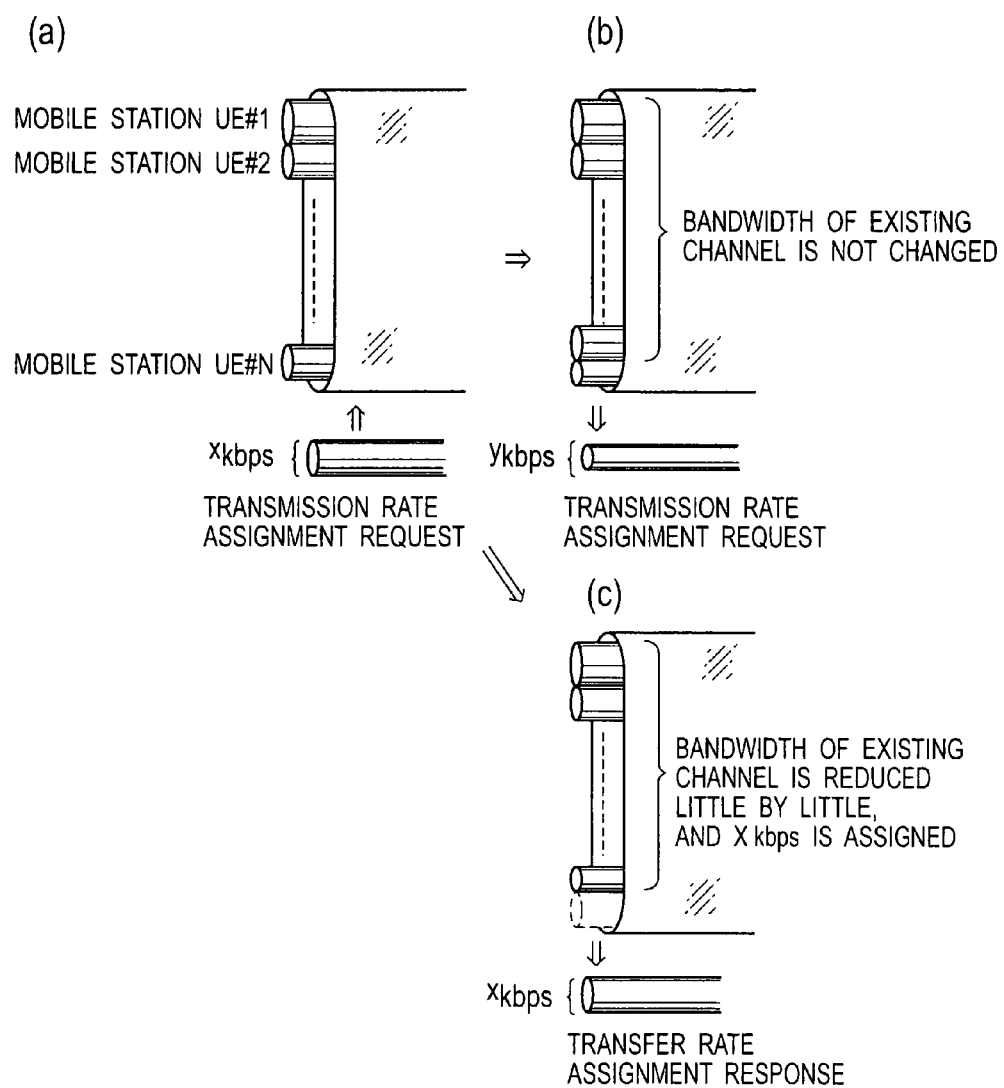
FIGS. 8(a) to 8(c) are views showing states of assigning the transmission rate of the uplink data in the base station according to the first embodiment of the present invention.

With reference to FIG. 8, a description will be made of a state where the transmission rate of the uplink data is assigned by the transmission rate assignment processing section 24 of the second base station Node-B #2 newly added to the soft handover.

A pipe shown in FIGS. 8(a) to 8(c) is one where the hardware resource (a despreader, a RAKE synthesizer, a buffer, a channel decoder, and the like) owned by the base station Node-B is schematically shown.

As described above, when the soft handover is started, the radio network controller RNC orders the newly added second base station Node-B #2 to assign the transmission rate of the uplink data for the communication between the second base station Node-B #2 and the mobile station UE. In an example of FIG. 8(a), the radio network controller RNC requests that x [kbps] be assigned, as the transmission rate of the uplink data.

In such a case, when the transmission rate assignment processing section 24 has already assigned a large number of the radio resources (hardware resources) to the other mobile stations, and it is difficult to assign x [kbps], two ways of behaviors of the second base station Node-B #2 are considered as shown in FIGS. 8(b) and 8(c).

As shown in FIG. 8(b), as the first behavior, a method is considered, in which the transmission rate assignment processing section 24 of the second base station Node-B #2 reports the assignable transmission rate (y [kbps] in an example of FIG. 8(b)) of the uplink data to the radio network controller RNC, without changing bandwidths of the existing channels (that is, without changing assignments of the transmission rates of the uplink data to the other mobile stations).

As shown in FIG. 8(c), as the second behavior, a method is considered, in which the transmission rate assignment processing section 24 of the second base station Node-B #2 reduces the bandwidths of the existing channels (that is, changes the assignments of the transmission rates of the uplink data to the other mobile stations), and assigns the requested transmission rate x [kbps] of the uplink data to the communication between the mobile station UE and the second mobile station Node-B #2.

It is not a good thing for a user that the transmission rate of the uplink data is reduced after the soft handover is started. Accordingly, it is desirable that the transmission rate assignment processing section 24 of the second base station Node-B #2 behave as shown in FIG. 8(c).

However, considering complexity of the mobile communication system, the case is also considered, where the behavior as shown in FIG. 8(b) must be made.

Moreover, the transmission rate assignment processing section 24 of the second base station Node-B #2 behaves as shown in FIG. 8(c), thus making it possible to perform a flexible changing control for the transmission rate of the uplink data in accordance with priority of the users, and the like.

The synchronization instruction reception section 25 is configured to receive a synchronization request transmitted from the radio network controller RNC, and to instruct the synchronization processing section 26 to perform predetermined synchronization processing.

The synchronization processing section 26 is configured to perform the synchronization processing (in a downlink network and an uplink network) between the mobile station UE and the second base station Node-B #2 and the synchronization processing (in a downlink network and an uplink network) between the radio network controller RNC and the second base station Node-B #2, in response to the instruction from the synchronization instruction reception section 25.

The SHO start instruction reception section 27 is configured to receive a start instruction transmitted from the radio network controller RNC, and to instruct the SHO start processing section 28 to perform the start processing for the soft handover.

The SHO start processing section 28 is configured to perform the processing for allowing the mobile station UE to start the soft handover between the first base station Node-B #1 and the second base station Node-B #2, in response to the instruction from the SHO start instruction reception section 27.

Figure 9:
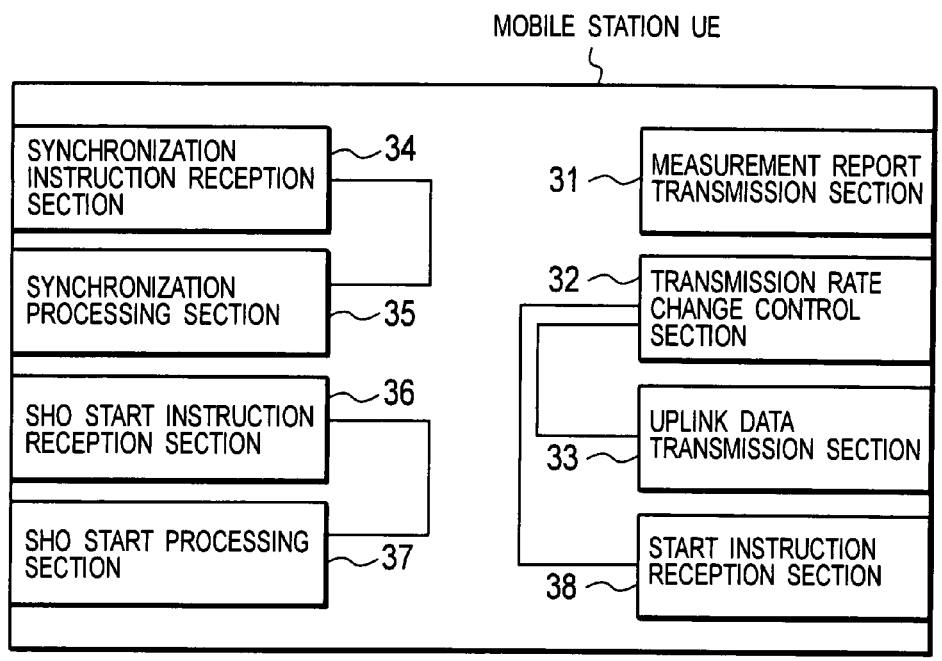
FIG. 9 is a functional block diagram of a mobile station according to the first embodiment of the present invention.

Functional blocks of the mobile station UE according to this embodiment are shown in FIG. 9. As shown in FIG. 9, the mobile station according to this embodiment includes a measurement report transmission section 31, a transmission rate change control section 32, an uplink data transmission section 33, a synchronization instruction reception section 34, a synchronization processing section 35, an SHO start instruction reception section 36, an SHO start processing section 37, and a start instruction reception section 38.

The measurement report transmission section 31 is configured to transmit the measurement report to the radio network controller RNC, when predetermined conditions are satisfied.

Here, a description will be made of an example of the case where the measurement report transmission section 31 transmits the measurement report, with reference to FIG. 10 and FIG. 11.

Figure 10:
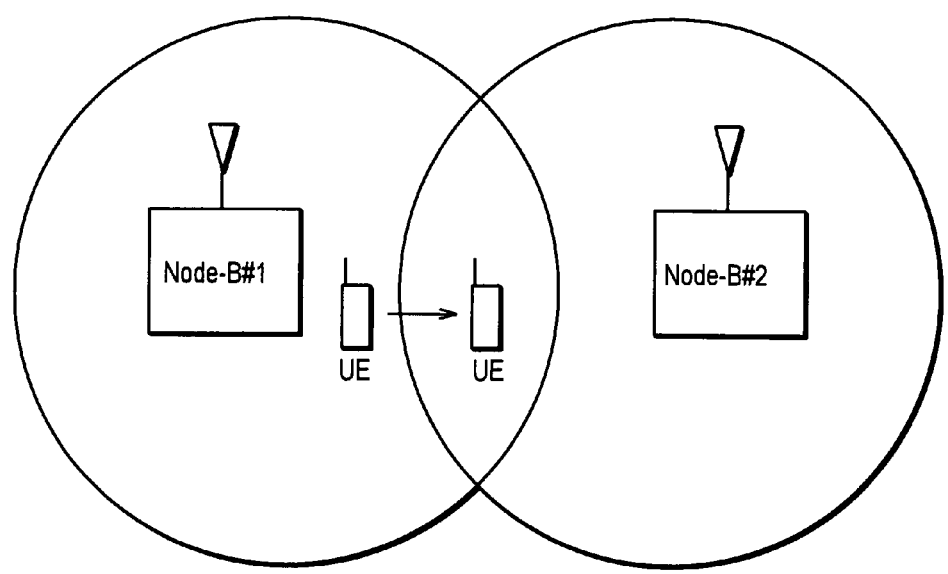
FIG. 10 is a view showing a state when the mobile station starts soft handover in the communication system according to the first embodiment of the present invention.
Figures 11, 12:
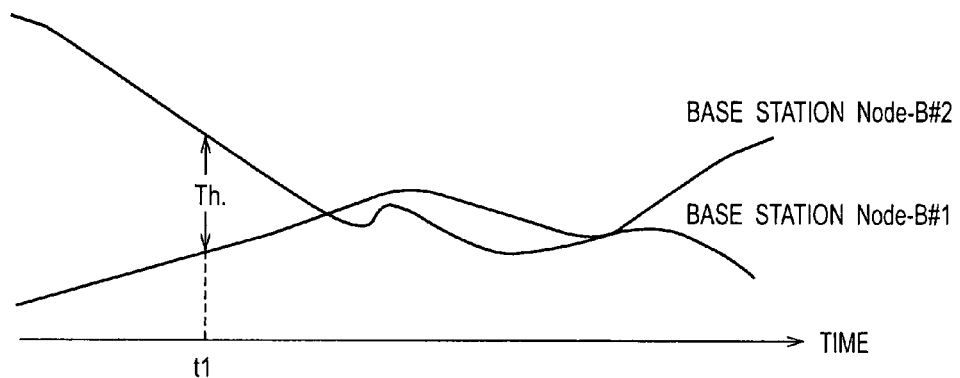
FIG. 11 is a view for explaining conditions for transmitting a measurement report in the mobile station according to the first embodiment of the present invention.
FIG. 12 is a view showing a state of controlling the transmission rate of the uplink data in the mobile station according to the first embodiment of the present invention.

As shown in FIG. 10, when the mobile station UE moves to an area where it is possible to perform the soft handover between the first base station Node-B #1 (base station under communication therewith) and the second base station Node-B #2 (newly detected base station), received power of a common pilot channel from the first base station Node-B #1 and received power of a common pilot channel from the second base station Node-B #2 vary as shown in FIG. 11.

When a difference between the above-described received powers of the common pilot channels reaches a predetermined threshold value, the measurement report transmission section 31 reports the above effect to the radio network controller RNC.

In an example of FIG. 11, at a time t1 when the difference between the above-described received powers of the common pilot channels reaches the predetermined threshold value Th, the measurement report transmission section 31 transmits a measurement report for indicating this effect to the radio network controller RNC.

The transmission rate change control section 32 is configured to perform the change control for the transmission rate of the uplink data to be transmitted to the base station Node-B, while the mobile station UE is making the communication with the base station Node-B.

Moreover, the transmission rate change control section 32 may be configured to stop the change control for the transmission rate of the uplink data, in response to an instruction from the start instruction reception section 38 (that is, when it is determined that the mobile station UE is to perform the soft handover between the first base station Node-B #1 and the second base station Node-B #2).

Furthermore, the transmission rate change control section 32 may be configured to resume the change control for the transmission rate of the uplink data, after the synchronization between the mobile station UE and the second base station Node-B #2 is established.

Furthermore, the transmission rate change control section 32 may be configured to use the transmission rate of the uplink data received together with the stop instruction by the start instruction reception section 38 (that is, the transmission rate of the uplink data which is designated by the radio network controller RNC), as the transmission rate of the uplink data which is used in the communication with the first base station Node-B #1, while the change control for the transmission rate of the uplink data is being stopped.

Moreover, the transmission rate change control section 32 may be configured to keep on stopping the control change for the transmission rate of the uplink data, while the mobile station UE is performing the soft handover.

Furthermore, in the state where the mobile station UE is performing the soft handover, the transmission rate change control section 32 may be configured not to increase the transmission rate of the uplink data, until a state appears, where the transmission rate of the uplink data is allowed to be increased for both of the first base station Node-B #1 and the second base station Node-B #2.

Specifically, as shown in FIG. 12, the transmission rate change control section 32 performs the change control for the transmission rate of the uplink data.

Here, FIG. 12 shows the transmission rate control information (transmission rate control bit decoded values) from the first base station Node-B #1 and the second base station Node-B #2, and displacements of the transmission rate of the uplink data in the mobile station UE.

As shown in FIG. 12, the transmission rate change control section 32 of the mobile station UE is configured not to increase the transmission rate of the uplink data, until all the base stations Node-B #1 and #2 under connection thereto issue the instruction "UP".

Moreover, in the case of having simultaneously received the transmission rate control information issuing the instruction "Keep" and the transmission rate control information issuing the instruction "Down", the transmission rate change control section 32 of the mobile station UE gives higher priority to the transmission rate control information issuing the instruction "Down".

The uplink data transmission part 33 is configured to transmit the uplink data at the transmission rate determined by the transmission rate change control section 32.

The synchronization instruction reception section 34 is configured to receive a synchronization instruction transmitted from the radio network controller RNC, and to instruct the synchronization processing section 35 to perform predetermined synchronization processing.

The synchronization processing section 35 is configured to perform the synchronization processing (in the downlink network and the uplink network) between the mobile station UE and the second base station Node-B #2, in response to the instruction from the synchronization instruction reception section 34.

The SHO start instruction reception section 36 is configured to receive the start instruction transmitted from the radio network controller RNC, and to instruct the SHO start processing section 37 to perform the start processing for the soft handover.

The SHO start processing section 37 is configured to perform the processing for allowing the mobile station UE to start the soft handover between the first base station Node-B #1 and the second base station Node-B #2, in response to the instruction from the SHO start instruction reception part 36.

The start instruction reception section 38 is configured to instruct the transmission rate change control section 32 to stop the change control for the transmission rate of the uplink data, in the case of having received the stop instruction transmitted from the radio network controller RNC.

Moreover, when the stop of the change control for the transmission rate of the uplink data is completed, the start instruction reception section 38 notifies the above effect to the radio network controller RNC.

(Operation of Mobile Communication System According to First Embodiment of the Present Invention)

Figure 13:
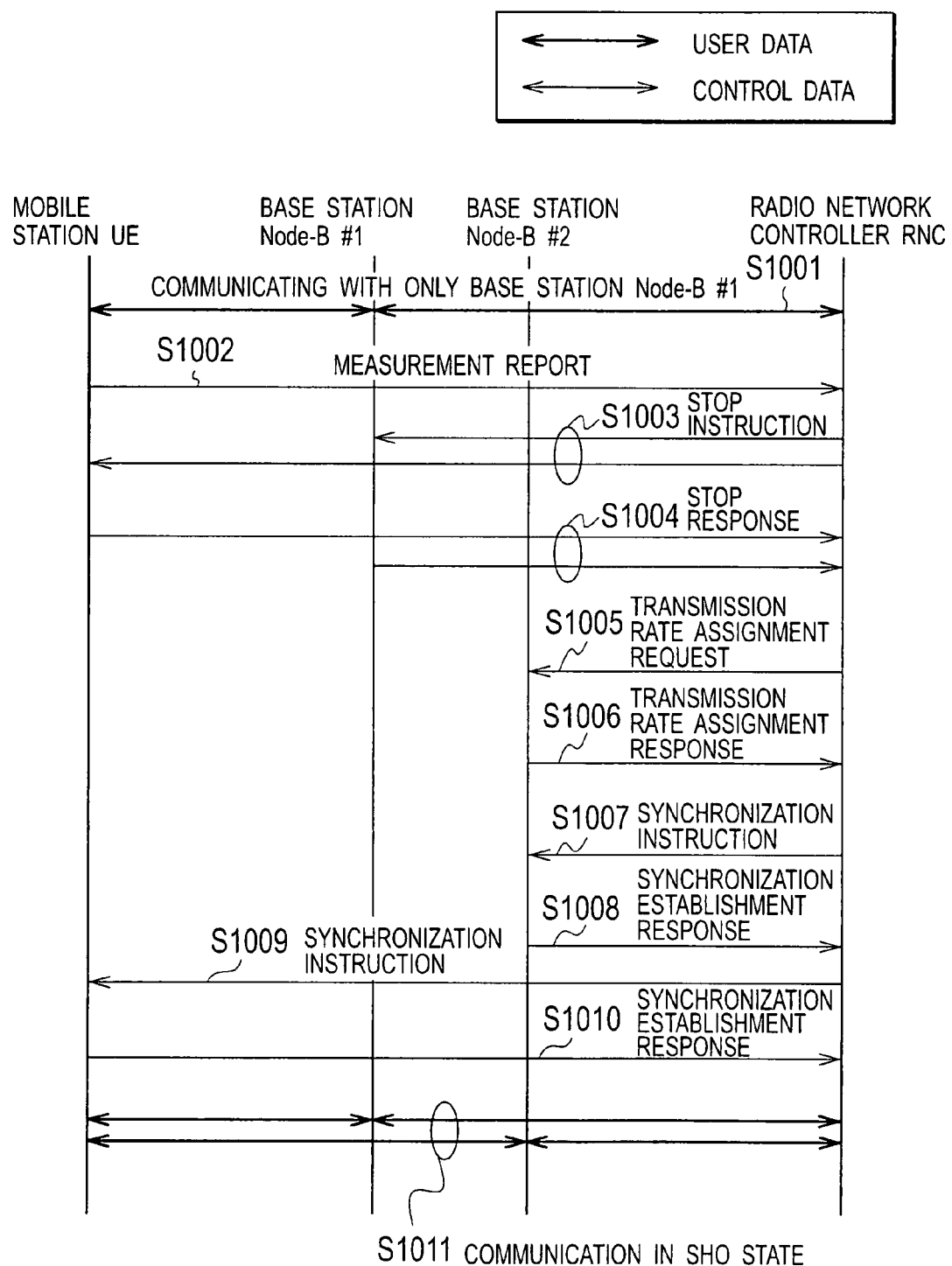
FIG. 13 is a sequence diagram showing an operation of the mobile communication system according to the first embodiment of the present invention.

A description will be made of an operation for starting the soft handover in the mobile communication system according to this embodiment with reference to FIG. 13.

In Step S1001, the mobile station UE is communicating with the first base station Node-B #1, and the first base station Node-B #1 is communicating with the radio network controller RNC.

In Step S1002, since the predetermined conditions are satisfied, the mobile station UE transmits the measurement report to the radio network controller RNC.

In Step S1003, the radio network controller RNC that has received the measurement report instructs the first base station Node-B #1 and the mobile station UE to stop the change control for the transmission rate of the uplink data.

At this time, the radio network controller RNC performs timing designation so that the change control for the transmission rate of the uplink data in the first base station Node-B #1 and the mobile station UE can be stopped at the same timing.

In Step S1004, the mobile station UE and the first base station Node-B #1 responds, to the radio network controller RNC, the effect that both of them have stopped the change control for the transmission rate of the uplink data.

In this event, the radio network controller RNC is notified of the transmission rate of the uplink data, when the transmission rate control for the uplink data is stopped from the first base station Node-B #1, the mobile station UE, or both of the first base station Node-B #1 and the mobile station UE.

In Step S1005, the radio network controller RNC that has received the transmission rate of the uplink data requests the second base station Node-B #2 to assign the received transmission rate of the uplink data to the communication with the mobile station UE.

In Step S1006, when it is possible to perform the above-described assignment of the requested transmission rate of the uplink data, the second base station Node-B #2 assigns the transmission rate of the uplink data, to the communication between the mobile station UE and the second base station Node-B #2, and transmits a transmission rate assignment response that indicates completion of the assignment to the radio network controller RNC.

Meanwhile, when it is impossible to perform the above-described assignment of the requested transmission rate of the uplink data, the second base station Node-B #2 transmits, to the radio network controller RNC, a transmission rate assignment response that includes the maximum assignable transmission rate of the uplink data in the second base station Node-B #2.

In Step S1007, in the case of detecting that it has been possible to assign the transmission rate of the uplink data based on the received transmission rate assignment response, the radio network controller RNC determines the transmission rate of the uplink data which is requested in Step S1005, as the transmission rate (initial value) of the uplink data when the soft handover is started.

Meanwhile, in the case of detecting that it has been possible to assign the transmission rate of the uplink data based on the received transmission rate assignment response, the radio network controller RNC determines the transmission rate of the uplink data which is included in the transmission rate assignment response, as the transmission rate (initial value) of the uplink data when the soft handover is started.

As a result, the radio network controller RNC instructs the second base station Node-B #2 to start the synchronization processing for the uplink network by the transmission rate of the uplink data, which is determined as the initial value.

In Step S1008, the second base station Node-B #2 starts the synchronization processing by the transmission rate of the uplink data, which is instructed by the synchronization instruction from the radio network controller RNC. When the synchronization of the uplink network between the second base station Node-B #2 and the radio network controller RNC has been established, the second base station Node-B #2 transmits a synchronization establishment response for indicating this effect to the radio network controller RNC.

In Step S1009, the radio network controller RNC requests the mobile station UE to establish the synchronization of the downlink network between the second base station Node-B #2 and the mobile station UE, in response to that the synchronization of the uplink network between the second base station Node-B #2 and the radio network controller RNC has been established.

In Step S1010, the mobile station UE establishes the synchronization of the downlink network with the second base station Node-B #2, and when such synchronization has been established, transmits a synchronization establishment response for indicating this effect to the radio network controller RNC.

In Step S1011, the mobile station UE starts the soft handover between the first base station Node-B #1 and the second base station Node-B #2, and resumes the change control for the transmission rate of the uplink data.

In accordance with the mobile communication system according to this embodiment, in the Enhanced Uplink, the change control for the transmission rate of the uplink data is stopped, when the soft handover is started. Accordingly, it becomes possible to surely assign the radio resource, a soft handover control in which an error rate is low can be performed, and a stable uplink data communication can be ensured.

In accordance with the mobile communication system according to this embodiment, the control change for the transmission rate of the uplink data is resumed, after the synchronization between the mobile station UE and the second base station Node-B #2 is established. Accordingly, such a circumstance can be avoided that the change control for the transmission rate of the uplink data is wasted between the mobile station UE and the second base station Node-B #2.

In accordance with the mobile communication system according to this embodiment, inquiries regarding the hardware resource (an inquiry as to whether or not the above-described assignment is possible, and an inquiry about a magnitude of the transmission rate, which enables the assignment, when the assignment is impossible) are made to the second base station Node-B #2 newly added to the soft handover, and thereafter, the transmission rate of the uplink data is determined. Accordingly, a more stable soft handover control can be performed.

(Function/Effect of Mobile Communication System According to First Embodiment of the Present Invention)

In accordance with the mobile communication system according to this embodiment, with regard to the change control for the transmission rate of the uplink data after the soft handover, the transmission rate of the uplink is not increased until the state appears, where the transmission rate of the uplink data is allowed to be increased for all the base stations Node-B. Accordingly, accuracy of a control for noise rise in each base station Node-B can be enhanced, while maintaining a required received power level by the soft handover.

(Mobile Communication System According to Second Embodiment of the Present Invention)

A description will be made of a mobile communication system according to a second embodiment of the present invention with reference to FIG. 14 and FIG. 15. A description will be mainly made of different points of the mobile communication system according to this embodiment from the mobile communication system according to the above-described first embodiment.

The mobile communication system according to this embodiment adopts a technology of the "common rate control" in the change control for the transmission rate of the uplink data. As shown in FIG. 14, in the technology of the "common rate control, the base station Node-B is configured to transmit, for example, the maximum transmission rate of the uplink data, or a parameter corresponding to the maximum transmission rate of the uplink data, and each mobile station UE is configured to transmit the uplink data at a transmission rate within the received maximum transmission rate of the uplink data.

Since the base station Node-B does not know at which transmission rate which mobile station transmits the uplink data thereto, the base station Node-B may be configured to gradually increase the above-described maximum transmission rate of the uplink data.

Figures 14, 15:
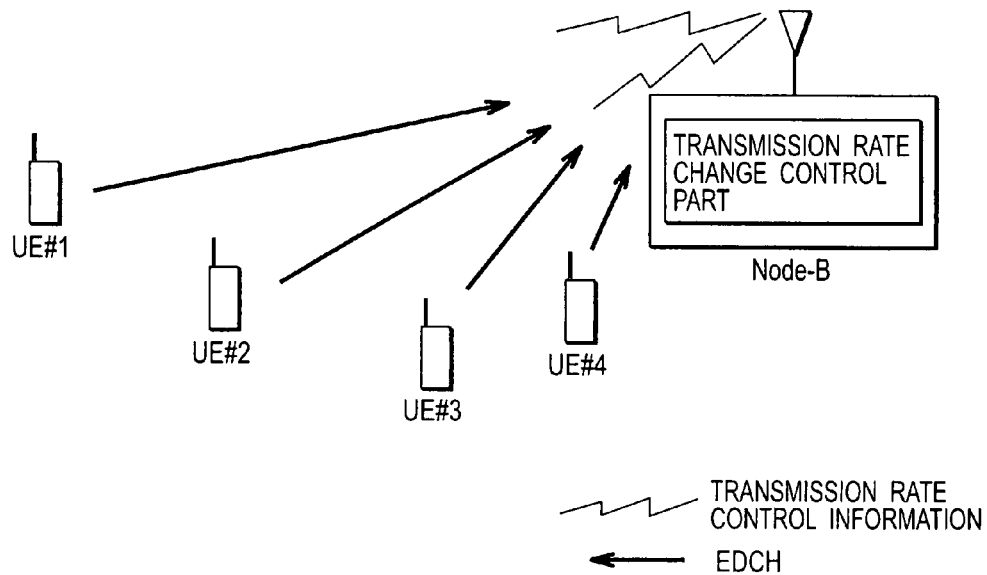
FIG. 14 is a view showing a state of controlling the transmission rate of the uplink data in a mobile communication system according to a second embodiment of the present invention.
FIG. 15 is a view showing a state of controlling the transmission rate of the uplink data in a mobile station according to the second embodiment of the present invention.

The transmission rate change control section 32 of the mobile station UE according to this embodiment performs the change control for the transmission rate of the uplink data as shown in FIG. 15.

Here, FIG. 15 shows the transmission rate control information (transmission rate control bit decoded values) from the first base station Node-B #1 and the second base station Node-B #2, and displacements of the transmission rate of the uplink data in the mobile station UE.

As shown in FIG. 15, the transmission rate change control section 32 of the mobile station UE is configured to transmit the uplink data at the lowest maximum transmission rate among the maximum transmission rates instructed by all the base stations Node-B #1 and #2 under the control of the radio network controller RNC.

In accordance with the mobile communication system according to this embodiment, when the soft handover is started, the transmission rate of the uplink data can be matched with the minimum value of the maximum transmission rates notified by the respective base stations Node-B #1 and #2, and accordingly, a stable communication becomes possible.

(Mobile Communication System According to Third Embodiment of the Present Invention)

Figure 17:
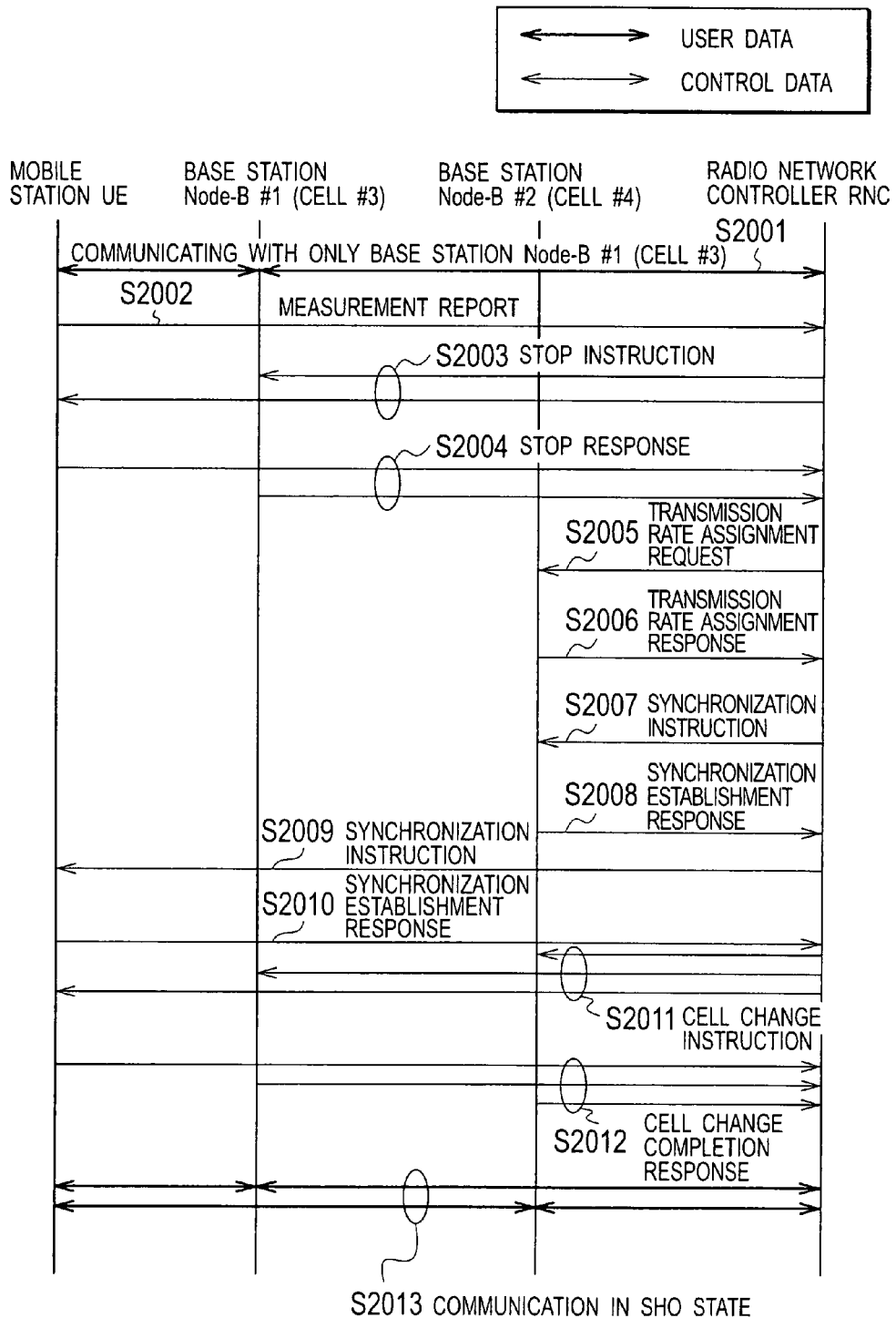
FIG. 17 is a sequence diagram showing an operation of the mobile communication system according to the third embodiment of the present invention.
Figure 18:
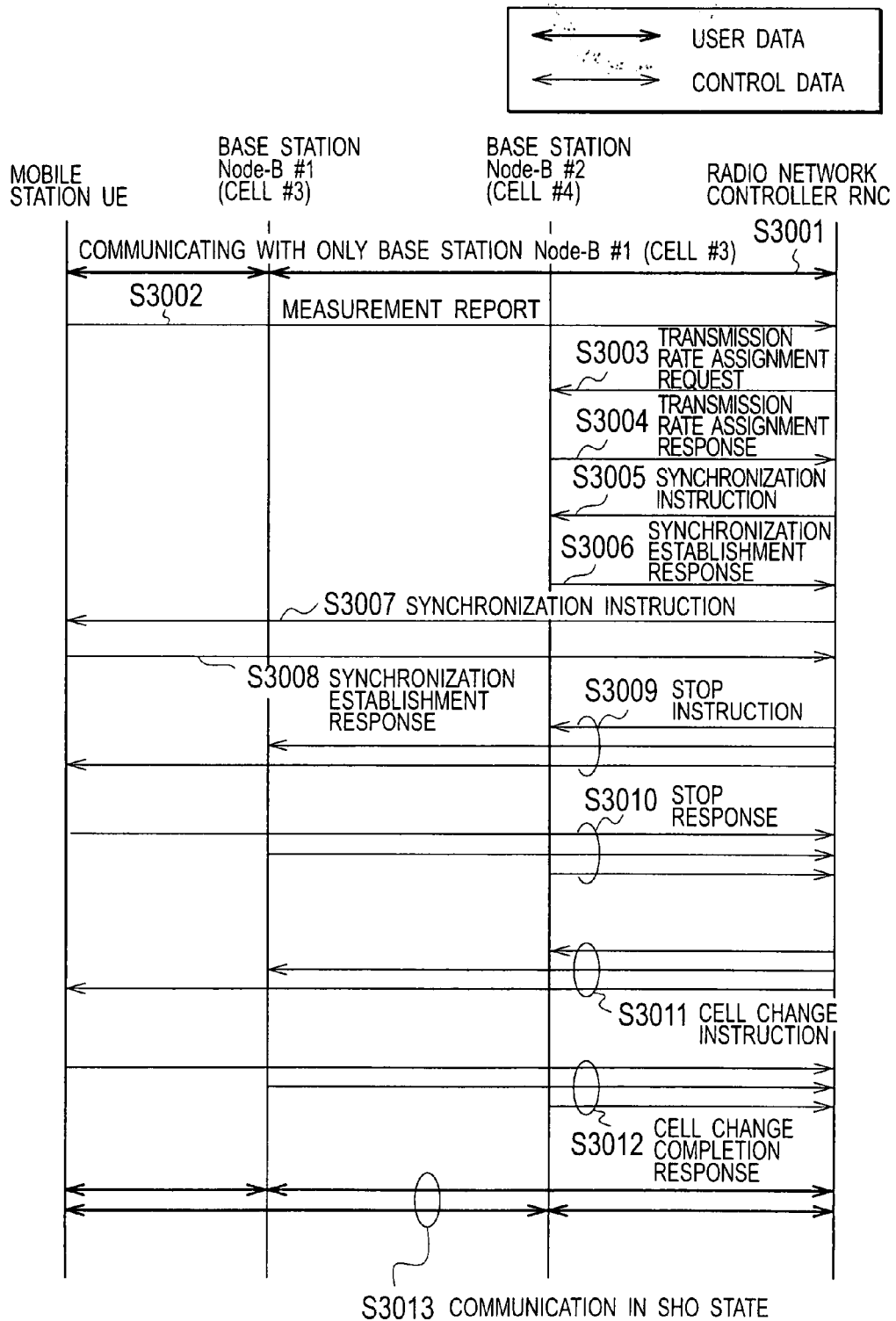
FIG. 18 is a sequence diagram showing an operation of the mobile communication system according to the third embodiment of the present invention.

A description will be made of a mobile communication system according to a third embodiment of the present invention with reference to FIG. 16 to FIG. 18. A description will be mainly made of different points of the mobile communication system according to this embodiment from the mobile communication system according to the above-described first embodiment.

Figure 16:
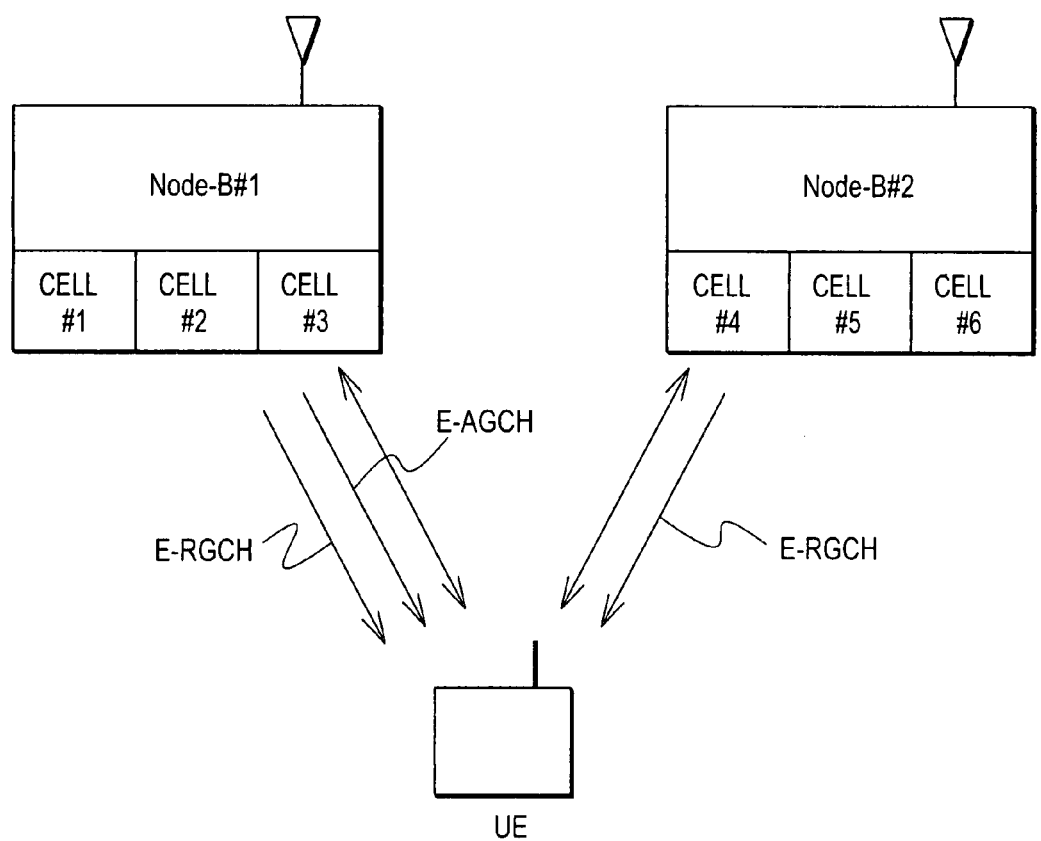
FIG. 16 is an entire configuration view of a mobile communication system according to a third embodiment of the present invention.

As shown in FIG. 16, in the mobile communication system according to this embodiment, a serving cell (a cell #3 in an example of FIG. 16) of the mobile station UE, which is a part of a function of the base station Node-B, is configured to transmit, to the mobile station UE, an absolute rate control channel (E-AGCH: Enhanced Absolute Grant Channel) and a relative rate control channel (E-RGCH: Enhanced Relative Grant Channel). Moreover, a non-serving cell (a cell #4 in an example of FIG. 16) of the mobile station UE, which is a part of the function of the base station Node-B, is configured to transmit a relative rate control channel (E-RGCH) to the mobile station UE.

Here, the absolute rate control channel (E-AGCH) is configured to transmit a transmission rate of uplink user data (or information for calculating the transmission rate of the uplink user data) in the mobile station UE.

Moreover, the relative rate control channel (E-RGCH) transmitted by the serving cell is configured to transmit information ("Up", "Down" or "Keep") that instructs an increase or decrease of the transmission rate of the uplink user data in the mobile station UE.

Furthermore, the relative rate control channel (E-RGCH) transmitted by the non-serving cell is configured to transmit information ("Down") that instructs the decrease of the transmission rate of the uplink user data in the mobile station UE.

A description will be made of a first operation for starting the soft handover in the mobile communication system according to this embodiment, with reference to FIG. 17.

In Step S2001, the mobile station UE is communicating with the cell #3 (serving cell) in the first base station Node-B #1, and the cell #3 in the first base station Node-B #1 is communicating with the radio network controller RNC.

In Step S2002, since the predetermined conditions are satisfied, the mobile station UE transmits the measurement report to the radio network controller RNC.

In Step S2003, the radio network controller RNC that has received the measurement report instructs the cell #3 and the mobile station UE to stop the change control for the transmission rate of the uplink data.

At this time, the radio network controller RNC performs the timing designation so that the change control for the transmission rate of the uplink data in the cell #3 and the mobile station UE can be stopped at the same timing.

In Step S2004, the mobile station UE and the cell #3 responds, to the radio network controller RNC, the effect that both of them have stopped the change control for the transmission rate of the uplink data.

In this event, the radio network controller RNC is notified of the transmission rate of the uplink data, when the transmission rate control for the uplink data is stopped from the cell #3, the mobile station UE, or both of the cell #3 and the mobile station UE.

In Step S2005, the radio network controller RNC that has received the transmission rate of the uplink data requests the cell #4 in the second base station Node-B #2 to assign the received transmission rate of the uplink data, to the communication with the mobile station UE.

In Step S2006, when it is possible to perform the above-described assignment of the requested transmission rate of the uplink data, the cell #4 assigns the transmission rate concerned of the uplink data to the communication between the mobile station UE and the cell #4, and transmits a transmission rate assignment response that indicates completion of the assignment to the radio network controller RNC.

Meanwhile, when it is impossible to perform the above-described assignment of the requested transmission rate of the uplink data, the cell #4 transmits, to the radio network controller RNC, a transmission rate assignment response for including the maximum assignable transmission rate of the uplink data in the cell #4.

In Step S2007, in the case of detecting that it has been possible to assign the transmission rate of the uplink data based on the received transmission rate assignment response, the radio network controller RNC determines the transmission rate of the uplink data which is requested in Step S2005, as the transmission rate (initial value) of the uplink data when the soft handover is started.

Meanwhile, in the case of detecting that it has been possible to assign the transmission rate of the uplink data based on the received transmission rate assignment response, the radio network controller RNC determines the transmission rate of the uplink data which is included in the transmission rate assignment response, as the transmission rate (initial value) of the uplink data when the soft handover is started.

As a result, the radio network controller RNC instructs the cell #4 to start the synchronization processing for the uplink network by the transmission rate of the uplink data, which is determined as the initial value.

In Step S2008, the cell #4 starts the synchronization processing by the transmission rate of the uplink data, which is instructed by the synchronization instruction from the radio network controller RNC. When the synchronization of the uplink network between the cell #4 and the radio network controller RNC has been established, the cell #4 transmits a synchronization establishment response for indicating this effect to the radio network controller RNC.

In Step S2009, the radio network controller RNC requests the mobile station UE to establish the synchronization of the downlink network between the cell #4 and the mobile station UE, in response to that the synchronization of the uplink network between the cell #4 and the radio network controller RNC has been established.

In Step S2010, the mobile station UE establishes the synchronization of the downlink network with the cell #4, and when such synchronization has been established, transmits a synchronization establishment response for indicating this effect to the radio network controller RNC.

In Step S2011, the radio network controller RNC determines to change the serving cell from the cell #3 to the cell #4, and notifies a cell change instruction to change the serving cell as described above to the mobile station UE, the cell #3, and the cell #4.

In Step S2012, the mobile station UE, the cell #3, and the cell #4 transmits, to the radio network controller RNC, a cell change completion response for notifying that the above-described change of the serving cell has been completed.

In Step S2013, the mobile station UE starts the soft handover between the cell #3 and the cell #4, and resumes the change control for the transmission rate of the uplink data.

A description will be made of a second operation for starting the soft handover in the mobile communication system according to this embodiment with reference to FIG. 18.

In Step S3001, the mobile station UE is communicating with the cell #3 (serving cell) in the first base station Node-B #1, and the cell #3 in the first base station Node-B #1 is communicating with the radio network controller RNC.

In Step S3002, since the predetermined conditions are satisfied, the mobile station UE transmits the measurement report to the radio network controller RNC.

In Step S3003, the radio network controller RNC receives the transmission rate of the uplink data in the mobile station UE, and requests the cell #4 in the second base station Node-B #2 to assign the received transmission rate of the uplink data.

In Step S3004, when it is possible to perform the above-described assignment of the requested transmission rate of the uplink data, the cell #4 assigns the transmission rate of the uplink data to the communication between the mobile station UE and the cell #4, and transmits a transmission rate assignment response for indicating completion of the assignment to the radio network controller RNC.

Meanwhile, when it is impossible to perform the above-described assignment of the requested transmission rate of the uplink data, the cell #4 transmits, to the radio network controller RNC, the transmission rate assignment response for including the maximum assignable transmission rate of the uplink data in the cell #4.

In Step S3005, in the case of detecting that it has been possible to assign the transmission rate of the uplink data based on the received transmission rate assignment response, the radio network controller RNC determines the transmission rate of the uplink data which is requested in Step S3003, as the transmission rate (initial value) of the uplink data when the soft handover is started.

Meanwhile, in the case of detecting that it has been possible to assign the transmission rate of the uplink data based on the received transmission rate assignment response, the radio network controller RNC determines the transmission rate of the uplink data which is included in the transmission rate assignment response, as the transmission rate (initial value) of the uplink data when the soft handover is started.

As a result, the radio network controller RNC instructs the cell #4 to start the synchronization processing for the uplink network by the transmission rate of the uplink data, which is determined as the initial value.

In Step S3006, the cell #4 starts the synchronization processing by the transmission rate of the uplink data which is instructed by the synchronization instruction from the radio network controller RNC. When the synchronization of the uplink network between the cell #4 and the radio network controller RNC has been established, the cell #4 transmits a synchronization establishment response for indicating this effect to the radio network controller RNC.

Here, it is defined that the cell #3 is the serving cell for the mobile station UE, and that the cell #4 is the non-serving cell for the mobile station UE.

In Step S3007, the radio network controller RNC requests the mobile station UE to establish the synchronization of the downlink network between the cell #4 and the mobile station UE, in response to that the synchronization of the uplink network between the cell #4 and the radio network controller RNC has been established.

In Step S3008, the mobile station UE establishes the synchronization of the downlink network with the cell #4, and when such synchronization has been established, transmits the synchronization establishment response for indicating this effect to the radio network controller RNC.

In Step S3009, the radio network controller RNC determines to change the serving cell from the cell #3 to the cell #4, and instructs the cell #3, the cell #4, and the mobile station UE to stop the change control for the transmission rate of the uplink data.

At this time, the radio network controller RNC performs timing designation so that the change control for the transmission rate of the uplink data in the cell #3 and the mobile station UE can be stopped at the same timing, and that the change control for the transmission rate of the uplink data in the cell #4 and the mobile station UE can be stopped at the same timing.

In Step S3010, the mobile station UE, the cell #3, and the cell #4 responds, the radio network controller RNC, to the effect that all of them have stopped the change control for the transmission rate of the uplink data.

In this event, the radio network controller RNC is notified of the transmission rate of the uplink data, when the transmission rate control for the uplink data is stopped from the cell #3, the mobile station UE, or both of the cell #3 and the mobile stations UE.

In Step S3011, the radio network controller RNC notifies the cell change instruction to change the serving cell from the cell #3 to the cell #4 to the mobile station UE, the cell #3, and the cell #4.

In Step S3012, the mobile station UE, the cell #3, and the cell #4 transmits, to the radio network controller RNC, the cell change completion response for notifying that the above-described change of the serving cell has been completed.

In Step S3013, the mobile station UE starts the soft handover between the cell #3 and the cell #4, and resumes the change control for the transmission rate of the uplink data.

The description has been made above in detail of the present invention by the embodiments; however, it is obvious for those skilled in the art that the present invention is not limited to the embodiments described in this application. The apparatus of the present invention can be embodied as modified and changed modes without departing from the gist and scope of the present invention, which are defined by the description of the scope of claims. Hence, the description of this application is for illustration and explanation purpose, and does not have any restrictive meaning to the present invention at all.

INDUSTRIAL APPLICABILITY

As described above, according to the present invention, there can be provided the mobile communication control method, the radio network controller, the base station, and the mobile station, which are capable of performing the soft handover control in which the error rate is low in the Enhanced Uplink.

The invention claimed is:

1. A mobile communication control method, comprising the steps of:
   performing a change control for a transmission rate of uplink data to be transmitted from a mobile station to a first cell while the first cell and the mobile station are communicating with each other;
   determining that the mobile station is to perform a cell change between the first cell and a second cell;
   instructing the first cell and the mobile station to stop the change control for the transmission rate of the uplink data;
   setting an initial value of the transmission rate of the uplink data in the cell change based on a response result from the second cell to assign the transmission rate of the uplink data, the response result being a response to a request for the second cell, and
   instructing the mobile station and the second cell to start the cell change by transmitting the initial value, wherein the initial value is transmitted after the response result is received.

2. The mobile communication control method according to claim 1, further comprising the step of:
   resuming the change control for the transmission rate of the uplink data, after synchronization between the mobile station and the second cell is established.

3. The mobile communication control method according to claim 1, further comprising the steps of:
   requesting the second cell to assign the transmission rate of the uplink data, which is used for the communication between the first cell and the mobile station, to a communication between the second cell and the mobile station;
   reporting, at the second cell, instruction information for indicating that the assignment is possible when the assignment is possible; and
   reporting, at the second cell, a maximum assignable transmission rate of the uplink data when the assignment is impossible.

4. A radio network controller, comprising:
   a measurement report reception section configured to receive, from a mobile station that is communicating with a first cell, a measurement report for reporting propagation path quality with a second cell, the propagation path quality being measured in the mobile station;
   a determination section configured to decide based on the received measurement report that the mobile station is to perform a cell change between the first cell and the second cell;
   a stop instruction section configured to instruct, in response to the determination, the first cell and the mobile station to stop a change control for the transmission rate of the uplink data to be transmitted from the mobile station to the first cell; and
   a cell change start instruction section configured to set an initial value of the transmission rate of the uplink data in the cell change based on a response result from the second cell to assign the transmission rate of the uplink data, the response result being a response to a request for the second cell, and to instruct the mobile station and the second cell to start the cell change by transmitting the initial value, wherein the initial value is transmitted after the response result is received.

5. The radio network controller according to claim 4, wherein the stop instruction section is configured to designate the transmission rate of the uplink data to be transmitted from the mobile station to the first cell while the change control for the transmission rate of the uplink data is being stopped.

6. The radio network controller according to claim 4, further comprising:
   a transmission rate assignment processing section configured to request the second cell to assign the transmission rate of the uplink data, which is used for the communication between the first cell and the mobile station, to a communication between the second cell and the mobile station.

7. A base station, including:
   a cell and a transmission rate change control section configured to perform a change control for a transmission rate of uplink data to be transmitted from a mobile station to a first cell while the first cell is communicating with the mobile station; wherein
   the transmission rate change control section is configured to stop the change control for the transmission rate of the uplink data when it is determined that the mobile station is to perform cell change between the first cell and a second cell, and
   the transmission rate change control section is configured to use an initial value set by a radio network controller as the transmission rate of the uplink data which is to be used for the communication with the mobile station when the cell change is instructed from the radio network controller, wherein the initial value is received from the radio network controller after a response result is received by the radio network controller from the second cell to assign the transmission rate of the uplink data, the response result being a response to a request for the second cell.

8. The base station according to claim 7, wherein the transmission rate change control section is configured to resume the change control for the transmission rate of the uplink data after synchronization between the mobile station and the second cell is established.

9. The base station according to claim 7, further comprising:
   a transmission rate assignment processing section is configured
   to determine whether or not a transmission rate of uplink data requested by the radio network controller can be assigned to a communication with the mobile station;

to report instruction information for indicating that the assignment is possible to the radio network controller when it is determined that the assignment is possible; and to report a maximum assignable transmission rate of the uplink data to the radio network controller when it is determined that the assignment is impossible.

10. The base station according to claim 9, wherein the transmission rate assignment processing section is configured to enable the assignment by lowering a transmission rate of the uplink data, which is to be used for a communication with an existing mobile station, when it is determined that the assignment is impossible.

11. A mobile station, including:

a transmission rate change control section configured to perform a change control for a transmission rate of uplink data to be transmitted to a first cell, while the mobile station is communicating with the first cell; wherein the transmission rate change control section is configured to stop the change control for the transmission rate of the uplink data when it is determined that the mobile station is to perform a cell change between the first cell and a second cell; and the transmission rate change control section is configured to use an initial value set by a radio network controller, as the transmission rate of the uplink data, when the cell change is instructed from the radio network controller, wherein the initial value is received from the radio network controller after a response result is received by the radio network controller from the second cell.

12. The mobile station according to claim 11, wherein the transmission rate change control section is configured to resume the change control for the transmission rate of the uplink data, after synchronization between the mobile station and the second cell is established.

* * * * *